US006955829B2

(12) United States Patent
Binley et al.

(10) Patent No.: US 6,955,829 B2
(45) Date of Patent: Oct. 18, 2005

(54) FROZEN ICE CONFECTION

(75) Inventors: Gary Norman Binley, Shambrook (GB); Petrus Martinus Bongers, Hellendoom (NL); Tommaso D'Agostino, Shambrook (GB); Wei Wang-Nolan, Shambrook (GB)

(73) Assignee: Good Humor - Breyers Ice Cream, division of Conopco, Inc., Green Bay, WI (US)

( * ) Notice: Subject to any disclaimer, the term of this patent is extended or adjusted under 35 U.S.C. 154(b) by 0 days.

(21) Appl. No.: 10/132,645

(22) Filed: Apr. 25, 2002

(65) Prior Publication Data

US 2003/0068409 A1 Apr. 10, 2003

(30) Foreign Application Priority Data

Apr. 27, 2001 (EP) .............................. 01303884

(51) Int. Cl.⁷ .............................. A23G 9/02; A23G 9/04
(52) U.S. Cl. ...................... 426/101; 426/565; 426/515; 426/524; 425/130
(58) Field of Search ................................ 426/101, 565, 426/515, 524; 425/130

(56) References Cited

U.S. PATENT DOCUMENTS

| | | | |
|---|---|---|---|
| 2,722,177 A | 11/1955 | Routh | |
| 3,671,268 A | 6/1972 | Blake et al. | |
| 4,399,160 A | 8/1983 | Schwartz et al. | |
| 4,447,458 A | 5/1984 | Roth et al. | |
| 4,877,634 A | 10/1989 | Pucci et al. | |
| 5,135,767 A | * 8/1992 | Daouse | 426/515 |
| 5,223,431 A | 6/1993 | Pucci et al. | |
| 5,425,958 A | * 6/1995 | Fazio et al. | 426/101 |
| 5,879,731 A | * 3/1999 | Beckett et al. | 426/101 |
| 6,004,800 A | 12/1999 | Aebischer et al. | |
| 6,242,023 B1 | * 6/2001 | Talbot et al. | 426/103 |
| 6,284,294 B1 | 9/2001 | French et al. | |
| 6,514,555 B1 | * 2/2003 | Fayard et al. | 426/565 |
| 6,534,106 B2 | * 3/2003 | Cathenaut et al. | 426/317 |
| 6,663,374 B1 | * 12/2003 | Marable et al. | 425/131.1 |

FOREIGN PATENT DOCUMENTS

| | | |
|---|---|---|
| DE | 195 10 601 | 9/1996 |
| EP | 0 363 633 A1 | 4/1990 |
| EP | 0 811 324 | 12/1997 |
| EP | 0 818 154 A1 | 1/1998 |
| SU | 619165 A | 6/1978 |
| WO | 97/39637 | 10/1997 |
| WO | 98/09534 | 3/1998 |
| WO | 98/37770 | 9/1998 |

OTHER PUBLICATIONS

European Search Report dated Nov. 26, 2002.
European Search Report dated Nov. 14, 2001.

* cited by examiner

*Primary Examiner*—N. Bhat
(74) *Attorney, Agent, or Firm*—Gerard J. McGowan, Jr.

(57) ABSTRACT

A process and apparatus for preparing a frozen ice confection comprising a frozen composition incorporating inclusions in a desired distribution by combining a flow of frozen composition with one or more flows comprising inclusions, in such a way that the flows comprising inclusions are introduced discontinuously at a multiplicity of positions in the cross-section of flow of frozen composition, and extruding the resulting combined flow without first subjecting the combined flow to any active blending step.

17 Claims, 4 Drawing Sheets

FROZEN ICE CONFECTION

TECHNICAL FIELD OF THE INVENTION

The present invention relates to a process for preparing a frozen ice confection, more particularly a process for incorporating inclusions, particularly soft fruit inclusions, into a frozen ice composition in a controlled manner to give a frozen ice confection. The invention further relates to an apparatus for use in the present process and to a frozen ice confection comprising soft fruit inclusions.

BACKGROUND TO THE INVENTION

Frozen ice confections comprising inclusions have hitherto generally been manufactured by an in-line process involving dosing the inclusions into the frozen composition using an inclusion feeder, blending the frozen composition and inclusions together to distribute the inclusions within the frozen composition and extruding and cutting the resulting product.

Similar methods for producing frozen confections comprising particulate edible material impressed onto the periphery of the body of a soft freezable confection, such as ice cream, are disclosed in U.S. Pat. No. 4,447,458.

A disadvantage of existing methods is the requirement to blend the individual components together to bring about dispersal of the inclusions with in the frozen composition. Conventionally, this is achieved by subjecting the combined materials to an active blending step, involving moving blending means such as a rotating paddle element. This blending step exposes the individual inclusions to significant shear effects, however, placing a significant restriction on the type of materials which can be incorporated into the frozen composition and consequently limiting the types of products which can be produced.

Where it is desired to produce an ice confection product comprising hard inclusions, such as nuts or chocolate pieces, for example, then the current, conventional method of manufacture can be used without difficulty. Such a method cannot generally suitably be used to prepare frozen ice confections incorporating dispersed inclusions of soft matter, such as soft fruit pieces, however, as the blending step has a detrimental effect on the integrity of the inclusion, giving an aesthetically unpleasing final product.

A further problem associated with conventional manufacturing techniques arises from the tendency of the inclusion to become dispersed to the outside edge of the mix during blending, as a result of the difference in viscosities of the components, leading to a lack of control over the pattern of distribution of the inclusions and hence to an unacceptably uneven distribution of inclusions in the final extruded product. Additionally, packing together the inclusions in an inclusion feeder prior to dosing leads to an increased risk of structural damage to the inclusion, rendering the method unsuitable for use in situations where retention of structural integrity of the inclusion is important (for example, with soft fruit pieces) and hence imposing limitations on the range of inclusion materials which can be used.

Where flows of two components are combined to give a mixed product, it is typically arranged that the individual flows converge approximately perpendicularly, in order to aid mixing. It is also known to blend flows of different materials to obtain dispersion of one material within the other by passive mixing by means of localised deflection of the combined flow in a static mixer. The incorporation of gelled inclusions in a frozen composition in such a manner is described, for example, in EP-A-0 811 324, Societe Des Produits Nestle S.A.).

The difficulties associated with processes for incorporating soft inclusions into frozen ice confections can be well illustrated by reference to the manufacture of ice cream products incorporating soft fruit inclusions. Such ice cream products are extremely popular with consumers and there is therefore considerable commercial interest in improved methods for their manufacture. Products incorporating discrete pieces of, or more especially whole, soft fruits, are particularly desired. Where the fruit ingredient is incorporated into the ice cream by the method described above, however, the shear effect to which the fruit is exposed upon introduction into the relatively higher viscosity ice cream flow, combined with the effect of the blending step tends to cause the fruit to break up, forming a pulp or puree, such that the final product contains very few, if any, distinct fruit pieces. Commercially available ice cream products comprising soft fruit inclusions notably tend not to have discrete whole fruits or even large pieces of fruit but rather have much smaller pieces. The larger the difference in viscosity between the ice cream and fruit components, the more this shear effect is exacerbated and so it would be expected to represent a particular problem where the ice cream used is higher viscosity ice cream prepared by extrusion at a temperature lower than is conventional in the art (such as is described in WO 97/39637 or WO 98/09534, both Unilever).

Approaches to overcoming the problems associated with incorporating soft fruit inclusions into ice confections which have been described in the literature include treating the fruit in some way before it is incorporated to make it less susceptible to shear damage. In U.S. Pat. No. 3,671,268 (Blake et al., assigned to Lever Brothers), for example, there is disclosed a method for preparing an ice cream product by forming a gelled fruit puree having a texture which is similar to the texture of fruit at room temperature and incorporating discrete pieces of this gelled puree into the ice cream.

Alternatively, soft fruit inclusions may be transformed into hard inclusions (for example by freezing and optionally dicing whole soft fruits) and incorporated into ice confections in the conventional manner. This is disadvantageous in economic terms as it involves increases in ingredient costs in addition to increased handling and processing costs.

Incorporation of fruit pieces into ice confections by careful hand mixing may be feasible on a small scale, say by an individual in the home, but is inappropriate for large scale industrial production. Even with hand mixing, it is difficult to produce a satisfactory product acceptable to the consumer in which the structure of the fruit pieces is not damaged. Controlling the distribution of fruit pieces in products prepared in this way also presents real problems.

Ice confections containing a plurality of inclusions prepared by automatically distributing the inclusions through a fruit feeder into the ice mix and disclosed in WO 98/37770.

There remains a continuing need to develop an improved method for incorporating inclusions, especially soft inclusions, into frozen ice confections which can be employed economically on a scale appropriate for industrial use. In particular, there remains a need to develop a method for incorporating fruit, especially soft fruit, inclusions into frozen ice confections wherein the structural integrity of the fruit inclusion is maintained to give an aesthetically pleasing product. A method which affords the possibility of controlling the pattern of distribution of the inclusions in the frozen ice confection product is particularly desired.

SUMMARY OF THE INVENTION

In one aspect, the present invention provides a method for preparing a frozen ice confection comprising inclusions dispersed in a frozen composition, which method comprises the steps of:- combining a flow of a frozen composition with one or more flows comprising inclusions, the flow of inclusions being introduced, discontinuously, at a multiplicity of positions in the cross-section of flow of the frozen composition to give a combined flow comprising inclusions dispersed in a frozen ice composition, and extruding the resulting combined flow.

In another aspect, the invention provides an apparatus for preparing a frozen ice confection comprising a frozen composition incorporating inclusions, the apparatus comprising:

a nozzle having a chamber and an outlet through which the frozen composition incorporating inclusions is extruded;

feeder means for supplying a flow of frozen composition into the chamber of the nozzle; and means for supplying one or more flows comprising inclusions into the flow of frozen composition to give a combined flow of frozen composition comprising inclusions, means for regulating the flow comprising inclusions, to allow said inclusions to be supplied discontinuously, the means for supplying inclusions discharging at a multiplicity of positions within the cross-section of flow of the frozen composition.

The invention further provides novel frozen ice confections comprising a frozen composition incorporating inclusions.

An 'inclusion' is a discrete, edible piece of a material which differs in some way (such as in composition, flavour, texture or colouring, for example) from the frozen composition material into which it is to be incorporated. Where the inclusion is a fruit piece, this is either a whole fruit or a discrete piece of sufficient size that it is distinguishable over fruit pulp. It will be appreciated that the absolute size of the individual fruit piece will depend on the type of fruit to be used.

By 'discontinuously' is meant that the flow of inclusions is not continuous but is interrupted, regularly or not.

As used herein, a nozzle comprises a chamber into which the matrix and fruit materials are fed and an outlet through which the combined product is extruded, the nozzle serving to define the form of the extrudate.

DETAILED DESCRIPTION OF THE INVENTION

The invention is based on the finding that an improved frozen ice confection, comprising a frozen composition incorporating inclusions in a desired distribution may suitably be prepared by a process involving combining a flow of frozen composition with one or more flows comprising inclusions, in such a way that the flows comprising inclusions are introduced discontinuously at a multiplicity of desired positions in the cross-section of flow of frozen composition, and extruding the resulting combined flow without first subjecting the combined flow to any active blending step.

By means of this method, the present inventors have found that it is possible to obtain a controlled dispersion of inclusions in the final product, while minimising any damage to the structural integrity of the inclusions arising from the manufacturing process.

Simplifying the manufacturing process by reducing the number of steps involved clearly has attendant economic advantages for industrial scale use but perhaps more importantly, it opens up the possibility of preparing products which cannot satisfactorily be prepared by existing processes.

A disadvantage associated with using the existing processes for preparing frozen ice confections comprising frozen compositions incorporating inclusions is the damage inflicted on the structural integrity of the inclusion. This adversely impacts on the aesthetic appeal of the final product and presents a particular problem where the inclusion is a soft inclusion, especially where the inclusion is a soft fruit. Indeed, frozen ice confections incorporating discrete soft fruit pieces cannot readily be obtained by conventional methods.

It is possible to obtain a product containing a reasonable amount of substantially intact soft inclusions by a conventional process by dosing in a very large amount of inclusions, since although many would be damaged there would be a likelihood that a proportion would survive substantially intact. This is disadvantageous however, in that there would be a background of damaged inclusion material mixed into the final product which may be unappealing. It would also be economically disadvantageous because of the likely high cost of the increased inclusion dosing necessary.

The present invention dispenses with the need for a separate blending step to disperse the inclusions within the frozen composition and minimises the time between the dosing of the inclusions and extrusion of the final confection product in order to reduce the shear effects to which the inclusions are exposed. The method of the invention therefore affords the possibility of preparing aesthetically acceptable products comprising inclusions, especially soft inclusions such as soft fruit pieces, which have hitherto not been readily obtainable.

In a further advantage, the present invention provides a method for controlling the pattern of dispersion of the inclusions within the frozen composition to give a visually attractive final product, for example, one in which the fruit pieces appear randomly distributed.

The method of the invention is applicable to any frozen composition conventional in the frozen ice confection art. Suitably the composition may be a frozen aerated material such as sorbet, frozen yoghurt, sherbet, frozen custard or water ice but is preferably ice cream. The present process finds particular application in the preparation of frozen confections incorporating ice cream prepared by the process of cold extrusion. The higher viscosity of such ice cream means that the mechanical shear on soft inclusions during normal processing is greater, hence the motivation to use a process which minimises the adverse impact on the final product of differences in viscosity between the constituent ingredients.

The method of the invention could also be used to produce a confection comprising more than one type of frozen composition, with inclusions incorporated into one or more of the frozen composition components. For example, different frozen compositions could be fed into the nozzle by separate feeder means, and the inclusions could be introduced either into the flow of individual frozen composition components in their individual feeder means or into the combined flow of frozen compositions in the nozzle.

Any type of edible, discrete inclusions may be incorporated into a frozen ice composition by the method of the invention, provided that they can be supplied in a physical form that is capable of being pumped, since the method of the invention requires that a flow of inclusion material is pumped through the apparatus. For example, pieces of any type of fruit may be incorporated, provided that they can be introduced in a suitable form, such as in a suspension with the natural fruit syrup. The method is particularly applicable to the preparation of frozen ice confections incorporating soft fruit pieces, such as, for example, raspberry, blackberry, gooseberry, banana, apricot, peach, orange, pineapple, plum and especially strawberry.

It will be appreciated that the method could also be used to incorporate discrete pieces of a material that is pumped through its supply means as a continuous phase but that can be cut into discrete pieces, by a suitable cutter means, at the point where the flow of said material is combined with a substantially co-directional flow of frozen composition. For example, discrete pieces of water ice, sherbet or ice cream could be incorporated in this way. Since the invention allows for the supply of multiple flows comprising inclusions, as discussed further below, it is straightforward to introduce more than one type of inclusion, if desired, by the method of the invention.

Combining a single continuous flow of inclusions with a flow of frozen composition in a fixed spatial relationship would give an extruded combined flow of final product in which the inclusions are present in a continuous, essentially columnar region within the frozen composition. Whilst a product having inclusions dispersed in a regular pattern might be acceptable, consumers generally find products in which the inclusions are dispersed throughout the frozen composition in irregular fashion more pleasing to the eye. Conventionally, this would be achieved by means of an active blending step, with its inherent disadvantages for soft inclusions, but the inventors have found that a good and controllable distribution can be obtained without the need for such a step by introducing either a multiplicity of flows of inclusions at points distributed across the cross-section of flow of the frozen composition or a single flow at a point in the cross-section of flow of the frozen composition which varies with time, and by arranging for the flows of inclusions to be discontinuous.

In a preferred embodiment of the invention, a plurality of separate flows comprising inclusions is introduced into the flow of frozen composition. Preferably, the inclusions are discharged in substantially parallel adjacent flows, so that the inclusions will be dispersed over the cross section area of the extruded product.

The number and position of discharge of flows comprising inclusions employed will then depend on the desired visual appearance of the final product and, in principle, is limited only by the cross section area of the flow of frozen composition into which the flows comprising inclusions are to be introduced. In this way, it is possible to achieve a product having the appearance of a random distribution of inclusions. Alternatively, by appropriate choice of number and position of inputs, specific patterns of inclusions within the frozen composition may be produced.

According to another embodiment, the distribution of inclusions within the frozen composition may be controlled by using an inclusion supply means which is moveable within the flow of the frozen composition. In this way, the position of input of the inclusion flow within the cross section of the flow of frozen composition (and hence the point of discharge of the inclusions into the frozen composition flow) may be varied. Conveniently, the inclusion supply means is moveable within the flow of frozen composition throughout the operation of the process.

Regardless of the mechanism used to achieve a dispersion of inclusions in the cross-section of flow of frozen composition, it is a requirement of the invention that the distribution of inclusions within the frozen composition is additionally controlled by intermittent interruption of the flow comprising inclusions into the flow of frozen composition. The regularity, frequency and duration of the interruptions will depend, in general, on the extrusion flow speed, size of the container and on the density and distribution pattern of inclusions desired in the final product. Where multiple flows comprising inclusions are provided, the interruptions may be synchronous or asynchronous depending, again, on the desired distribution of inclusions in the final product.

In another embodiment, the inclusions may be further dispersed in the frozen composition by passing the combined flows through deflecting means prior to extrusion. In this way, the distribution of inclusions can be modified to give a final extruded frozen confection product having a seemingly random distribution of inclusions while at the same time minimising the mechanical shear effects on the individual inclusions.

In order to minimise the shear effects that arise when flows of materials of different viscosities are combined, the invention provides that the flow of frozen composition and the flows comprising inclusions are preferably substantially co-directional at the points where they are combined. For the purposes of the invention, this means that the angle between the converging flows is between 0° and 45°, suitably no more than 30°, preferably no more than 20°. In a particularly preferred embodiment, the flows to be combined run in parallel. The consequence is a reduction in the extent of physical damage to the inclusions that arises, compared to the conventional situation, where the flows are oriented substantially perpendicularly at the point where they are combined.

In order to reduce further the shear effect on the inclusions resulting from combining their flow with that of the frozen composition, the flows are preferably combined close to the point of extrusion in a nozzle, conveniently within a distance of no more than 2 meters, preferably no further than 1 meter away from the nozzle. More preferably, the frozen composition and the inclusion material are supplied separately to, and combined within, the nozzle chamber immediately prior to extrusion. The shape of the nozzle is not critical to the invention but preferably is chosen so as to achieve the objectives of maximising the cross-section area and minimising the length of the combined flow, in order to minimise the shear forces acting on the fruit and the length of time during which said forces are effective.

The method of the invention provides for one of more flows of frozen composition to be used but preferably a plurality of separate flows of frozen composition is used. Where a plurality of flows is employed, it is preferred that these all have the same flow velocity. According to a particularly preferred embodiment, the frozen composition is discharged into the nozzle, distal to the nozzle outlet, while the inclusions are discharged at a more proximal position within the nozzle, so that the frozen composition is already flowing towards the nozzle outlet at the point when the flow comprising inclusions is combined with it.

Also provided according to the invention is an apparatus for preparing a frozen ice confection comprising a frozen composition incorporating inclusions, the apparatus comprising:

a nozzle having a chamber and an outlet through which the frozen composition incorporating inclusions is extruded;

feeder means for supplying a flow of frozen composition into the chamber of the nozzle; and means for supplying one or more a flows comprising inclusions into the flow of frozen composition to give a combined flow of frozen composition comprising inclusions, means for regulating the flow comprising inclusions, to allow said inclusions to be supplied discontinuously, the means for supply inclusions discharging at a multiplicity of positions within the cross-section of flow of the frozen composition.

The chamber of the nozzle should be of sufficiently large cross-sectional area compared to the frozen composition feeder means and the inclusion supply means that the pressure within the chamber, and therefore the forces acting on the inclusions as a result of the flow of the combined materials, are reduced. The nozzle outlet may have a somewhat smaller cross-section area than the chamber of the nozzle but should be of larger cross-sectional area than the feeder means and supply means. The size of the nozzle outlet is not critical to the invention and depends on the size of the container into which the final product is to be extruded and the desired appearance of the product.

Conveniently, the nozzle comprises two or more reversibly detachable sections so as to allow it to be disassembled for cleaning purposes. This has the additional advantage of enabling the section containing the outlet to be exchanged, affording the possibility of achieving a different extrusion pattern in the product if desired. Typically, the nozzle is made of any material suitable for use with food, hereinafter referred to as food grade material and is suitably stainless steel.

The flow of frozen composition is supplied by means of one or more feeder means discharging into the chamber of the nozzle. Preferably, these feeder means discharge, separately, into the nozzle chamber laterally with respect to the axis of the chamber. It is particularly preferred to provide tubes supplying the frozen composition in two separate flows discharging laterally with respect to the axis of the chamber and from opposing sides. This is advantageous in the factory operation as it helps to produce a constant weight distribution of the final product when it is extruded into a container of some type. It is also beneficial in terms of the visual appearance of the resulting product.

The inclusions are introduced either by multiple supply means discharging at points distributed across the cross-section of flow of the frozen composition, or by a single such supply means the point of discharge of which, in the cross-section of flow, varies with time. Preferably the supply means are arranged so that the flow comprising the inclusions is substantially co-directional with the flow of frozen composition, at the point where the flows are combined. The point at which the flows are combined may be within the frozen composition feeder means but in a preferred embodiment of the invention, the inclusion supply means discharge into the nozzle chamber, preferably substantially in parallel. The arrangement of the frozen composition feeder means and the inclusion supply means is preferably such that the frozen composition is discharged distal to the outlet of the nozzle, while the means for supplying the inclusions extend into the chamber and are directed towards the nozzle outlet, so that the inclusions are discharged at a more proximal position within the chamber of the nozzle, thereby ensuring that the flow of said inclusions within the chamber is substantially co-directional with that of the frozen composition.

Means are provided to allow the flow in each of the inclusion supply means to be regulated in a controlled fashion by intermittent interruption. Suitable regulator means are well known in the art. Conveniently, for example, regulation is achieved by means of changeover valves, positioned upstream of the points where the flows comprising inclusions are combined with the flow of frozen composition. Where multiple inclusion supply means are provided, these may be regulated individually or two or more supplies may be coupled so that they can be regulated by a single valve.

The feeder means for the frozen composition and the inclusion supply means suitably comprise pipes constructed from a food grade material, which may be flexible or hard. Food grade stainless steel is an especially suitable material.

In one embodiment, the apparatus further comprises moving means for moving the terminal part of the tube supplying the inclusions such that the position of discharge of the flow comprising inclusions into the cross-section of the flow of frozen composition varies with time. Conveniently, the moving means comprise a motor driven device which moves the terminal section of the inclusion supply means within the nozzle or within the frozen composition feeder means, as appropriate.

In another embodiment, the apparatus additionally comprises means for deflecting the combined flow during its passage through the nozzle chamber towards the nozzle outlet. These deflecting means have the effect of causing the inclusions to become redistributed within the frozen composition without imparting significant shear forces on them. Conveniently, the deflecting means are static mixers (baffles), such as are well known in the art. The baffles should be positioned within the chamber so as to deflect the combined flow of inclusions and frozen composition, leading to distribution of the inclusions within the frozen composition and reducing localisation of the inclusions in the extruded product. Preferably, the baffles are arranged peripherally on the inside wall of the chamber and are suitably made of the same food grade material as the nozzle chamber. The size and shape of the baffles used is chosen so as to minimise the shear effect whilst allowing for sufficient flow of material. Suitably, the static mixer element has an open area with multiple fingers.

As mentioned above, the method of the invention can suitably be used with any type of inclusions that are capable of being pumped, whether hard or soft, but is particularly advantageous for preparing frozen ice confections comprising discrete pieces of soft inclusions, especially soft fruits, such as strawberries, which cannot readily be prepared by other means.

Accordingly, in another aspect the invention provides novel frozen ice confections comprising soft inclusions dispersed in a frozen composition. Suitably the soft inclusions are soft fruit pieces, preferably strawberries or strawberry pieces.

For the purpose of defining this aspect of the invention it is convenient to establish a parameter by means of which it is possible to compare the relative softness of various inclusions independently of the size and volume of individual inclusions. The present inventors have found that a suitable parameter is the average energy, per unit volume, required to cause a decrease of 30% in the length of the inclusion sample along a given axis, when a force is applied in the direction of this axis. For convenience this is referred to hereinafter as the 'total energy' per unit volume. This can readily be measured by means of a plate compression test (for example, using a Textural Analyzer, Texture Technologies Corp., Scarsdale, N.Y., USA). The inventors have found that a total energy per unit volume of 400 J/m³ represents the lower limit of processability for fruit inclusions in conventional blending processes. Below this limit, conventional methods for incorporating fruit pieces into frozen ice confections lead to damage to the structural integrity of the fruit pieces. Accordingly, as used herein, a 'soft' inclusion is an inclusion for which the total energy per unit volume is less than 400 J/m³.

Using the method of the invention, it is possible to produce frozen ice confections incorporating inclusions, especially soft fruit pieces, wherein the structural integrity of the inclusions in the final product is retained to a greater degree than in products prepared by conventional processes. The structural integrity of the inclusions following processing can conveniently be established by assessing whether or to what extent they are recoverable intact from the final product. This can conveniently be determined, for example, by a method involving rinsing the thawed final product through a sieve of such a mesh size that only substantially intact inclusions will be retained, while damaged inclusions, for example pureed material, and thawed frozen composition pass through, and observing whether any inclusions remain on the sieve. The inventors have found that a mesh size of 1 mm is suitable for determining whether structural integrity is retained and so in distinguishing novel products according to the invention over known products.

Also provided are frozen ice confections comprising soft fruit pieces dispersed in a frozen composition wherein the average number of fruit pieces recoverable from a given volume of the frozen confection, after said confection has been thawed and washed through a sieve having a mesh size of 1 mm, is at least 80% of the average number of fruit pieces, capable of being retained in said sieve, that were used in preparing said volume of frozen confection.

Further provided are frozen ice confections comprising soft fruit pieces dispersed in a frozen composition wherein the average weight of fruit pieces recoverable from a given volume of the frozen confection, after it has been thawed and washed through a sieve having a mesh size of 1 mm, is at least 60% of the average weight of fruit pieces, capable of being retained in said sieve, that were used in preparing said volume of frozen confection.

BRIEF DESCRIPTION OF THE DRAWINGS

Having described the invention in general terms, preferred embodiments will be described in detail as an aid to understanding the invention. These embodiments are illustrated in FIGS. 1 to 4.

Figure 1:
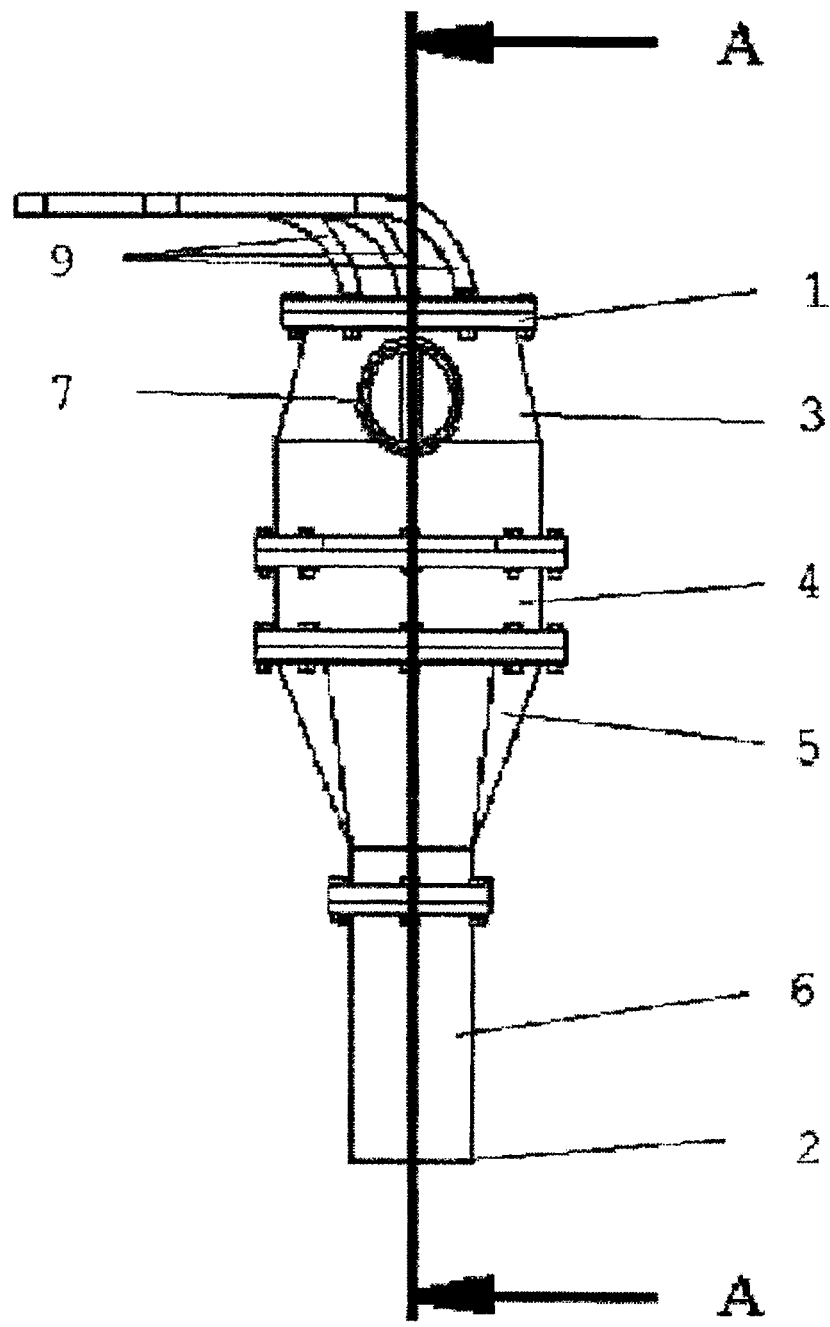
FIG. 1 shows a side view of a nozzle, with its accompanying feeder pipes, according to the invention.
Figure 2:
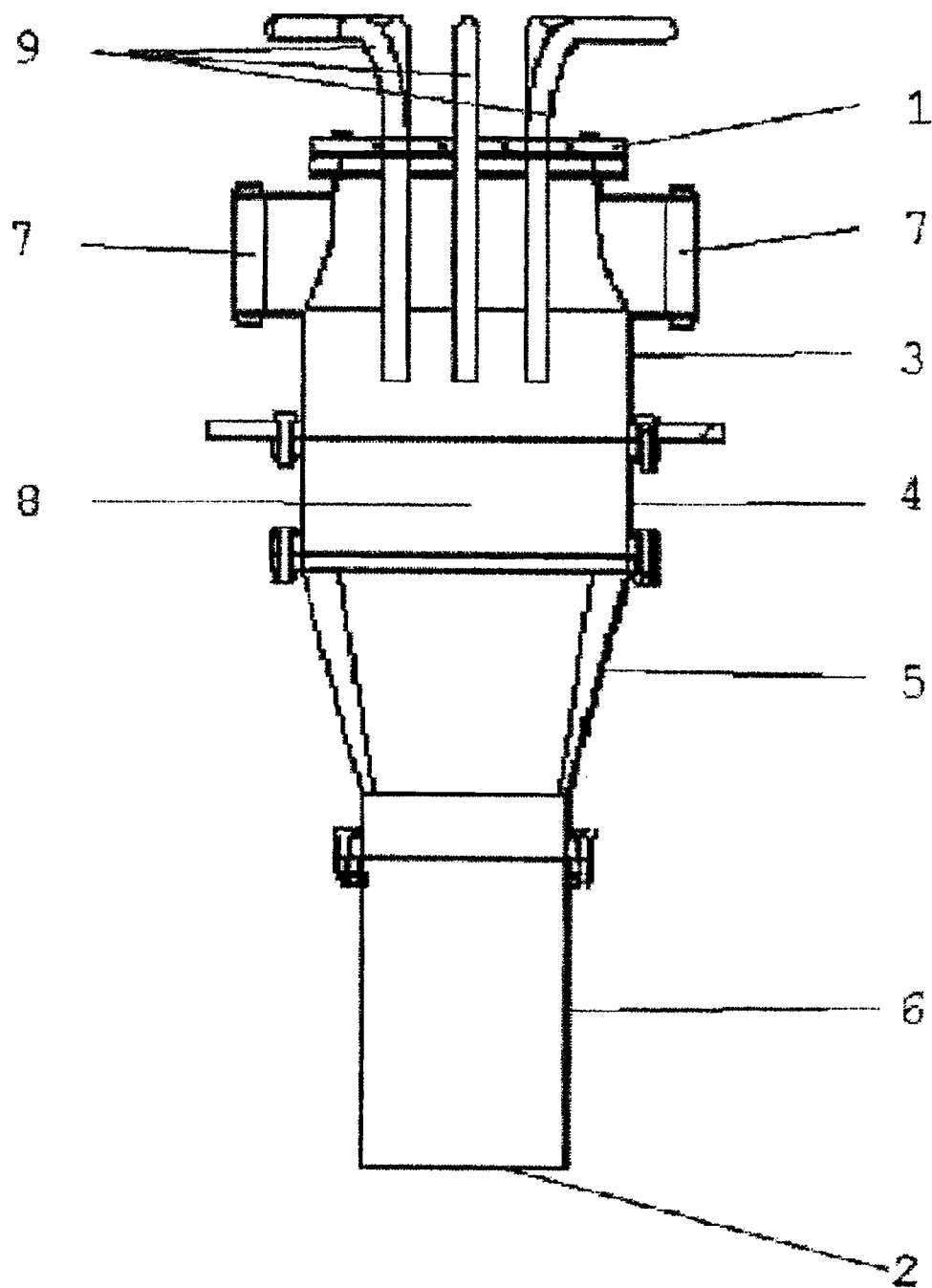
FIG. 2 shows a longitudinal section in the plane AA, through the nozzle of FIG. 1.

The main body of the nozzle shown in FIGS. 1 and 2 is in the form of a vertically mounted barrel, closed at the top by means of a flat plate (1) and having an outlet (2) through which the combined product is extruded, at the other end. The side walls of the nozzle are constructed, in this particular embodiment, of four sections (3–6) bolted together.

Two feeder pipes (7) suitable for conducting the frozen composition, discharge laterally and from opposite sides into the chamber of the nozzle (8). These pipe outlets are located in the top section (3) of the nozzle wall, distal to the nozzle outlet. A plurality of feeder pipes (9), suitable for the introduction of inclusions, pass through holes in the top plate (1) and extend into the chamber of the nozzle so that they discharge at a position closer to the nozzle outlet (2) than do the pipes (7) that carry the frozen composition.

The nozzle is tapered in the third section (5) so that the bottom section (6), proximal to the nozzle outlet, is narrower than the upper part. The cross section of this bottom section is constant throughout its length and is designed to provide the combined product in an extrusion of a shape suitable for accommodation in a receptacle (not shown) located below the nozzle outlet. Means for cutting off appropriately sized portions of extrudate (not shown) are provided immediately downstream of the nozzle outlet.

The flows of frozen composition and of inclusions are driven through their separate feeder pipes by means of suitable pumps (not shown). In a preferred embodiment, the flow of inclusions through the feeder pipes (9) is regulated by means of changeover valves, located at a point before the pipes enter the nozzle.

Figure 3:
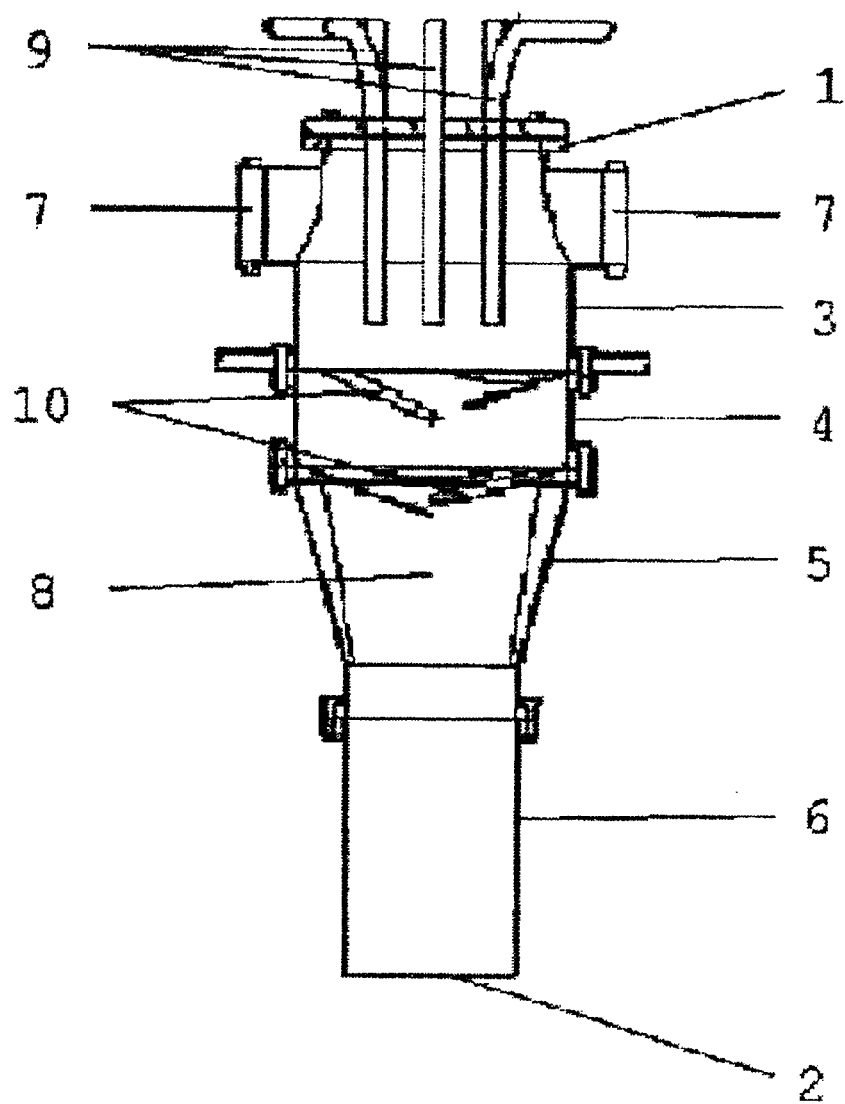
FIG. 3 shows a longitudinal section through an alternative nozzle, comprising a static mixer element.

The construction of the nozzle in the alternative embodiment shown in FIG. 3 is very similar, with the additional feature that there are provided, mounted on the inside of the nozzle wall, below the point at which the inclusions are discharged into the chamber, two static mixer elements (10). Each of these comprises a plurality of baffles that serve to deflect the flow of material within the nozzle and thereby alter the distribution of inclusions in the extruded product.

The following examples are provided by way of illustration only.

EXAMPLE 1

Analysis of Softness of Fruit Inclusions

Fruit pieces of types commonly used as ice cream inclusions were subjected to textural analysis. The pieces were packed in sealed plastic containers and stored at +2° C. until they were ready to be tested. Just before the textural analysis, the sealed containers were open and a small quantity of inclusions was taken out and transfers to the room for analysis. One sample of strawberries was frozen and kept at −25° C., then thawed out overnight in a refrigerator before textural analysis.

Textural analysis was done at room temperature (~22° C.). 4 to 6 representative pieces of each fruit were selected for testing. The fruit pieces were separated from syrup and laid out on a white-coloured flat surface. Pictures were taken before the pieces were tested to record their sizes and shapes. A ruler was positioned in the picture as a reference. From the pictures, the areas of the fruit pieces were determined and used in the data analysis to correct for the non-uniform size and shape. The area of the fruit pieces was measured by imaging analysis software (Scion Corporation, Frederick, Md., U.S.A) from the pictures of the fruit pieces. The pixel size on each picture was calibrated by using the ruler in the picture. The boundaries of fruit pieces were determined by eye, drawn in by hand and the areas of the fruit pieces were then calculated by the software.

Experiments were conducted by plate compression using a Textural Analyzer (Texture Technologies Corp., Scarsdale, N.Y., U.S.A). The plate diameter was 40 mm, which was larger than the largest fruit piece size (20 mm in length). The crosshead speed was 60 mm/min and a 2 kg load cell was used. As the plate moved down to compress the specimen, the data collection started as soon as the force exceeded 0.05

Figure 4:
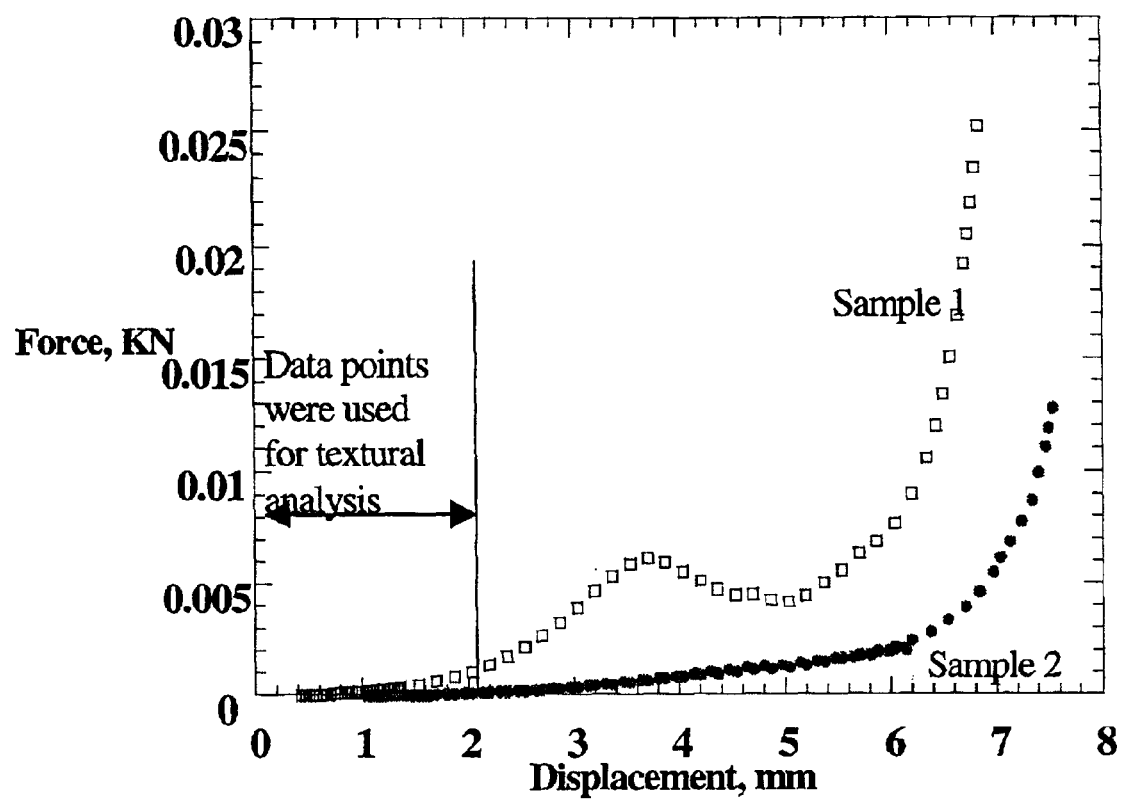
FIG. 4 is a graph of two representative force and displacement curves from Example 1.

N. For each fruit piece, a force and displacement plot was produced. FIG. 4 shows two representative force and displacement curves. The force and displacement curve for Sample 1 has a relative maximum at a displacement of 3.7 mm. This relative maximum indicates a failure such as a fracture in the fruit piece or a breakdown in the cellular structure. As force data beyond the displacement at which failure occurs cannot be compared with the force data from fruit pieces that did not fail (Sample 2), only the force data before a failure were analyzed. Examination of all force and displacement curves revealed that the minimum displacement at which a failure occurred, for any of the fruit pieces studied, was 2 mm. Thus, only force data up to 2 mm displacement were analyzed. The force and displacement curves for the fruit pieces were fitted to a third-order polynomial ($R^2 > 0.99$). From the fitted polynomial equations, the forces at 2 mm displacement were calculated.

In addition, the fitted polynomial equations were also used to produce stress and stain plots, where stress is the force divided by the area of fruit piece and strain is the displacement divided by the original height of the piece. The stress/strain plots are independent of dimensional factor unlike the force/displacement plots. By examining all stress and strain plots, the minimum strain at which any failure occurred was found to be 30%. Thus the stress of the fruit pieces was compared at a strain of 30%. The area under the stress and strain curves, which is the total energy per unit volume required to produce a given strain, was calculated up to 30% strain for each sample. The stiffness, which is a measure of the hardness of fruit piece, was calculated from the gradient of stress and strain curve at 30% strain.

The textural analysis results are summarised in the table below. It is clear that the strawberry samples (from different sources and whether or not they had been frozen and thawed) had the lowest total energy per volume and stiffness. The next softest fruit studied was the blackberry, which was found to have a total energy per unit volume around 2.5 times greater than even the most robust of the strawberries. This correlated well with the observation that attempts to incorporate these strawberries into a flow of ice cream using a conventional fruit feeder at −15° C. resulted in severe damage to the integrity of the fruit. By contrast, no significant problems were encountered with incorporating substantially intact pieces of any of the other fruits studied using a conventional feeder.

Textural Analysis of Fruit Pieces

EXAMPLE 2

Validation of Multi-Injection Soft Fruit Inclusion Trials at the Factory Scale The incorporation of fruit pieces into vanilla ice cream using a variety of nozzle configurations according to the invention was investigated.

A 5-liter multi-injection nozzle was mounted onto an in-line filler. Ice cream was extruded and cut by heated blades, samples were collected for evaluation. A number of experiments were conducted with no static mixers, one or two static mixers in the nozzle. Two types of static mixers, with different baffle arrangements, were tested. When there was no static mixer element, the same flanges used to hold the static mixers remain in the nozzle, so the nozzle overall height was unchanged throughout all experiments. In most of experiments conducted, the fruit feeding pipes into the nozzle were straight. In some experiments, however, one or more of the fruit pipes were bent to test whether change of the pipe position can alter fruit distribution within the nozzle.

A progressive cavity pump was used to pump fruit pieces. The pump was capable of delivering the fruit at a rate of between 20 kg/hr and 70 kg/hr. At 950 l/hr ice cream premix flow rate, the total amount of fruit introduced into ice cream was about 7%.

In order to try to achieve a good dispersion of fruit in the product, the flow of pieces into the nozzle was switched on and off as a function of time, by means of changeover valves. Each of the individual fruit feeder pipes had a valve, only one of them being open at one time and all of them having the same open and closed time intervals.

Most of the experiments were carried out using strawberry pieces, about 2 mm in length. The inclusion material supplied to the nozzle contained about 60% strawberry pieces and 40% syrup/juice. Some experiments were also carried out with apricot inclusions. The pieces were much smaller but firmer than the strawberry ones, about 1 mm cube size. The distribution patterns obtained were found to be very similar to those obtained with strawberry. The results described below are those obtained for strawberry inclusions.

Results

In the absence of static mixer elements, the regular array of pipes supplying the fruit pieces was closely reflected in a very regular distribution of fruit pieces in the extruded

| Inclusions (supplier) | Ave Force at 2 mm (N) | STD displacement (N) | Ave Stress at 30% strain (Pa) | STD (Pa) | Total engery per volume (J/m^3) | STD (J/m^3) | Stiffness (Pa) | STD (Pa) |
|---|---|---|---|---|---|---|---|---|
| strawberry, small (Kibon) | 0.25 | 0.14 | 347.93 | 175.69 | 57 | 20 | 1,083 | 507 |
| strawberry, large (Kibon) | 0.31 | 0.22 | 488.81 | 378.60 | 62 | 47 | 1,544 | 1,174 |
| strawberry (Ola) | 0.16 | 0.12 | 996.19 | 707.09 | 138 | 91 | 3,028 | 2,362 |
| strawberry (Ola) | 0.21 | 0.06 | 1607.29 | 691.49 | 202 | 80 | 5,016 | 2,224 |
| blackberry (Ola) | 0.34 | 0.10 | 3242.96 | 639.01 | 503 | 92 | 9,216 | 2,381 |
| banana (Ola) | 0.72 | 0.45 | 4672.89 | 2804.05 | 606 | 269 | 14,549 | 9,482 |
| pineapple (Ola) | 1.71 | 0.93 | 5467.25 | 3045.11 | 646 | 299 | 15,031 | 8,758 |
| mango (Ola) | 1.01 | 0.59 | 6169.70 | 3351.05 | 739 | 416 | 19,388 | 10,715 |
| apricot (Ola) | 2.18 | 2.02 | 8522.02 | 6135.62 | 753 | 426 | 25,618 | 19,942 |
| forest fruits (Ola) | 0.49 | 0.23 | 6017.26 | 2364.92 | 862 | 322 | 18,505 | 7,448 |
| banana (Miko) | 0.91 | 0.20 | 10323.22 | 2026.62 | 1,018 | 213 | 34,282 | 6,797 |
| blackberry (Ola) | 0.65 | 0.34 | 7801.99 | 4061.59 | 1,055 | 471 | 24,047 | 13,251 |

Note: STD: standard deviation product. The incorporation process caused very little apparent damage to the fruit pieces.

Variation of the timing of the changeover valves regulating the supply of fruit pieces affected the distribution of pieces in the product, as well as its quality. The best strawberry distribution and appearance were obtained with a valve timing of 0.1 second open/1.0 second closed without any static mixer elements inside the nozzle. This provided a product in which, though there was only 6% of strawberry pieces by weight, every scoop of ice cream had strawberry pieces. This result was not achievable using a conventional fruit feeder and a similar dosing of strawberries. Changing the timing to 0.1 second open/0.6 second closed, resulted in the appearance of small voids in the product, as the ice cream did not fill in all the holes created by the intrusion of the fruit piece supply pipes as effectively as it did when a longer gap was left between valve openings.

Under the same processing conditions, bending two of the fruit supply pipes had the desired effect of making the strawberry distribution less regular in the product, without causing any evident impairment of the quality of the pieces.

When one or two static mixer elements were placed in the nozzle, to deflect the flow of the combined ice cream and strawberry pieces, it was found that the pattern of the included pieces was more random and no longer obviously reflected the pattern of the supply pipes. However there was a tendency for an excessive proportion of strawberry pieces to became concentrated in the middle of the tub.

EXAMPLE 3

Estimation of the Recovery Rate of Fruit Inclusions from Ice Cream

A sample of 500 g of ice cream containing fruit pieces was placed in a sieve (1 mm mesh size) and rinsed under warm running water, with very gentle agitation. After all of the ice cream had been washed away, the fruit pieces left in the sieve were collected, counted and weighed. The amount of fruit pieces (by weight or by number) recovered divided by the amount originally incorporated into this quantity of ice cream is the recovery rate.

| Product | Recovery rate (by weight) | Recovery rate (by number) |
|---|---|---|
| Ice cream with strawberry inclusions produced by using a conventional fruit feeder and −5° C. ice cream | ~50% | ~70% |
| Ice cream with strawberry inclusions produced by using a process according to the invention and −15° C. ice cream | ~70% | ~90% |

What is claimed is:

1. A method for preparing a frozen ice confection comprising inclusions dispersed in a frozen composition, which method comprises the steps of:
    combining a flow of a frozen composition with one or more flows comprising inclusions,
    the flows of inclusions being introduced, discontinuously, at a multiplicity of positions in the cross-section of flow of the frozen composition to give a combined flow of inclusions dispersed in a frozen ice composition, and
    extruding the resulting combined flow.

2. A method according to claim 1 wherein the frozen composition comprises sorbet, frozen yoghurt, sherbet, frozen custard, water ice, ice cream or a mixture thereof.

3. A method according to claim 1 wherein the frozen composition comprises ice cream prepared by the process of cold extrusion.

4. A method according to claim 1 wherein the inclusions comprise soft fruit pieces.

5. A method according to claim 4 wherein the inclusions comprise strawberry pieces.

6. A method according to claim 1 wherein a single flow of inclusions is introduced into the flow of frozen composition at a position in the cross-section of said flow which varies with time.

7. A method according to claim 1 wherein a plurality of flows comprising inclusions are introduced into the of flow of the frozen composition.

8. A method according to claim 1 wherein a plurality of separate flows of frozen composition are used.

9. A method according to claim 1 wherein the flows of frozen composition and of inclusions are combined at an angle of no more than 45°.

10. A method according to claim 1 wherein the flows are combined immediately prior to extrusion.

11. A method according to claim 1, wherein the combined flow of frozen composition and inclusions is passed through static deflecting means prior to extrusion.

12. An apparatus for preparing a frozen ice confection comprising a frozen composition incorporating inclusions, said apparatus comprising:
    a nozzle having a chamber and an outlet through which the frozen composition incorporating inclusions is extruded;
    feeder means for supplying a flow of frozen composition into the chamber of the nozzle; and
    means for supplying one or more flows comprising inclusions into the flow of frozen composition to give a combined flow of frozen composition comprising inclusions,
    means for regulating the flow comprising inclusions, to allow said inclusions to be supplied discontinuously,
    the means for supplying inclusions discharging at a multiplicity of positions within the cross-section of flow of the frozen composition.

13. An apparatus according to claim 12 wherein the frozen composition feeder means discharge frozen composition into the nozzle chamber laterally with respect to the axis of the chamber.

14. An apparatus according to claim 12 wherein the inclusion supply means discharge the inclusions into the nozzle chamber.

15. An apparatus according to claim 14 wherein the frozen composition feeder means discharge distal to the outlet of the nozzle.

16. An apparatus according to claim 12 further comprising means for deflecting the combined flow within the nozzle chamber.

17. An apparatus according to claim 12 further comprising means for moving the inclusion supply means such that the position of discharge of the inclusions into the cross-section of flow of frozen composition in the feeder supply means varies with time.

* * * * *